(12) United States Patent
Hughes et al.

(10) Patent No.: US 6,453,020 B1
(45) Date of Patent: Sep. 17, 2002

(54) VOICE PROCESSING SYSTEM

(75) Inventors: Jeremy Peter James Hughes, Polygon; Brian Hulse, Romsey; Caroline Edith Maynard; John Brian Pickering, both of Winchester, all of (GB); Hoyt McClure Stewart, Raleigh, NC (US); Mark George Stewart Reid Thomas, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/027,698

(22) Filed: Feb. 23, 1998

(30) Foreign Application Priority Data

May 6, 1997 (GB) ............................................. 9709185

(51) Int. Cl.$^7$ ................................................ H04M 1/64
(52) U.S. Cl. ............................... 379/88.04; 379/88.17; 379/88.25; 379/406.01
(58) Field of Search ........................... 379/67.1, 70, 80, 379/88.01, 88.02, 88.07, 88.25, 88.03, 88.04, 88.27, 88.28, 91.01, 91.02; 704/233, 246, 275; 455/563

(56) References Cited

U.S. PATENT DOCUMENTS

| 4,914,692 A | * | 4/1990 | Hartwell et al. ............. 379/410 |
| 5,155,760 A | * | 10/1992 | Johnson et al. ............ 379/88.01 |
| 5,459,781 A | | 10/1995 | Kaplan et al. ............... 379/351 |
| 5,475,791 A | | 12/1995 | Schalk et al. ................ 704/233 |
| 5,581,600 A | * | 12/1996 | Watts et al. ............... 379/88.02 |
| 5,619,565 A | * | 4/1997 | Cesaro et al. ................ 379/386 |
| 5,708,704 A | * | 1/1998 | Fisher .......................... 379/410 |
| 5,761,638 A | * | 6/1998 | Knittle et al. ................ 704/233 |
| 5,765,130 A | * | 6/1998 | Nguyen ....................... 704/233 |
| 5,765,131 A | * | 6/1998 | Stentiford et al. ........... 704/277 |
| 5,771,273 A | * | 6/1998 | McAllister et al. ........ 379/88.01 |
| 5,978,763 A | * | 11/1999 | Bridges ....................... 704/233 |
| 6,073,095 A | * | 6/2000 | Dharanipragada et al. .. 704/242 |
| 6,125,284 A | * | 9/2000 | Moore et al. ................ 455/557 |
| 6,282,268 B1 | * | 8/2001 | Hughes et al. ............ 379/88.02 |

FOREIGN PATENT DOCUMENTS

| EP | 0736995 | 3/1996 | ............ H04M/3/50 |
| GB | 2251765 | 7/1992 | ............ H04M/3/42 |
| GB | 2280820 | 8/1995 | ............ H04M/3/50 |
| WO | WO96/25733 | 8/1996 | ............ G10L/3/00 |

OTHER PUBLICATIONS

IBM Publication, DirectTalk/6000 "Speech Recognition with the HARK Recognizer", Release 5, SC33–1589–00, Jul. 1995.

* cited by examiner

Primary Examiner—Scott L. Weaver
Assistant Examiner—Roland G. Foster
(74) Attorney, Agent, or Firm—Jerry W. Harndon

(57) ABSTRACT

A voice processing system comprising a digital trunk processor 135 and a system unit 145 incorporates a local voice recognition resource 185 provided on a digital signal processing board 180, and can access a remote voice recognition resource 320 in a server 300 via a local area network 250. The system provides a barge-in facility for the recognition resource on the remote server, whereby a prompt is played out to the user, and the incoming telephony signal is fed into a voice activity detector on the digital trunk processor. Responsive to a detection of incoming voice activity, the outgoing prompt is terminated, and the incoming data is transferred over the local area network to the remote server for recognition.

12 Claims, 4 Drawing Sheets

VOICE PROCESSING SYSTEM

BACKGROUND OF THE INVENTION

The present invention relates to voice processing systems, and more particularly to voice processing systems which utilise particular processing resources, such as voice recognition systems.

Voice processing systems whereby callers interact over the telephone network with computerised equipment are very well-known in the art, and include voice mail systems, voice response units, and so on. Typically such systems ask a caller (or called party) questions using prerecorded prompts, and the caller inputs answers by pressing dual tone multiple frequency (DTMF) keys on their telephones. This approach has proved effective for simple interactions, but is clearly restricted in scope due to the limited number of available keys; on a telephone. For example, alphabetical input is particularly difficult using DTMF keys.

There has therefore been an increasing tendency in recent years for voice processing systems to use voice recognition in order to augment DTMF input. The adoption of voice recognition permits the handling of callers who do not have a DTMF phone, and also the acquisition of more complex information beyond simple numerals from the caller.

One particular concern with voice processing systems is to allow a caller to interrupt a prompt before it has finished (for example, if they are familiar with the system from regular use, such as might be the case with a voice mail system, and therefore know in advance their desired option). Most voice processing systems already allow a caller to interrupt a prompt by pressing an appropriate DTMF key. This is achieved by listening for incoming DTMF signals at the same time as an outgoing prompt is being played.

It is desirable to allow the caller to perform a similar interruption by speaking, rather than pressing a DTMF key. The caller input is processed by the voice recogniser, and the system then performs the requested action. The ability to accept such interruptions during an outgoing prompt is known as barge-in or cut-through.

One difficulty with the support of barge-in is that an outgoing prompt may be partially echoed back from the telephone network, and then accidentally mistaken for voice input from the caller, or else distort actual voice input from the caller. Many voice recognition systems therefore include an echo cancellation facility in order to facilitate barge-in. Effectively, such echo cancellation involves subtracting from the incoming signal a suitably transformed version of the outgoing signal, the intention being that the subtracted transformed version of the outgoing signal negates any echo that might be received.

The following documents are illustrative of the current art in the voice processing industry.

WO96/25733 (BT) describes a voice response system which includes a prompt unit, a Voice Activity Detector (VAD), and a voice recognition unit. In this system, as a prompt is played to the caller, any input from the caller is passed to the VAD, together with the output from the prompt unit. This allows the VAD to perform echo cancellation on the incoming signal. Then, in response to the detection of voice by the VAD, the prompt is discontinued, and the caller input is switched to the reco unit, thereby providing a barge-in facility.

U.S. Pat. No. 5,459,781 describes a voice processing system with a line interface unit, an echo cancellation unit (adjacent to the line interface unit), a voice activity detector (VAD), a prompt unit, a DTMF detector, and a recorder. In this system, both incoming and outgoing signals pass through the echo cancellation unit, where echo cancellation is performed. This system addresses the problem that caller voice input to the recorder may accidentally be mistaken for DTMF input. Therefore, if the VAD detects incoming speech to be recorded, the DTMF detection is switched off (since it is unlikely that the caller would make a genuine DTMF input at this time). It is also suggested that VAD could be used to avoid recording silence, thereby conserving resources.

U.S. Pat. No. 5,155,760 discloses a voice mail system including a voice recorder, a circular buffer, a voice activity detector (VAD), a prompt unit, a line interface unit, and an echo cancellation unit adjacent to the line interface unit. Caller input and prompt output are passed to the echo cancellation unit to allow echo cancellation to be performed. In operation, a prompt is played to the caller. Caller input is then routed to the VAD, and also to the circular buffer. In response to the VAD detecting voice, the caller input is fed to the voice recorder, along with the buffer contents. This ensures that the first part of the caller input (which triggered the VAD) is also properly recorded.

U.S. Pat. No. 5,475,791 describes a voice processing system including a prompt unit, a buffer, and a digital signal processor (DSP) unit for performing echo cancellation, voice activity detection (VAD), and speech recognition. In this system, a prompt is played to the caller, and both the caller input and prompt are fed to the DSP unit to perform echo cancellation. The echo cancelled signal is fed (i) to the buffer, and (ii) to a VAD algorithm. On detecting voice, the outgoing prompt is terminated, and the DSP switches from echo cancellation mode to speech recognition mode, whereupon speech recognition is then performed on the caller input, including that stored in the buffer.

One of the drawbacks with the approach described in U.S. Pat. No. 5,475,791 is that the DSP is required throughout the time that barge-in is enabled, firstly to perform echo cancellation, and then to perform voice recognition. However, DSP resource, particularly for voice recognition, is expensive, and this can prove prohibitive if the voice processing system is to support many lines of telephony input simultaneously.

Many voice processing systems include a special DSP card for running voice recognition software. This card is connected to the line interface unit for the transfer of telephony data by a time division multiplex (TDM) bus. Most commercial voice processing systems, more particularly their line interface units and DSP cards, conform to one of two standard architectures: either the Signal Computing System Architecture (SCSA), or the Multi-vendor Integration Protocol (MVIP).

A somewhat different configuration is described in GB 2280820, in which a voice processing system is connected via a local area network to a remote server, which provides a voice recognition facility. This approach is somewhat more complex than the TDM approach, given the data communication and management required, but does offer significantly increased flexibility. For example, there is no need to match a DSP card with a line interface unit conforming to the same bus architecture, and also a single server can support multiple voice processing systems (or vice versa). However, the existence of two such different configurations can cause problems for the user, who generally has to tailor their application for one specific configuration, constraining the generality of such application.

Note also that if the voice recognition system described in U.S. Pat. No. 5,475,791 is provided as part of the server system in the arrangement of GB 2280820, then the need to transmit the prompt output to the DSP to perform the echo cancellation becomes particularly troublesome. Thus having to transmit the prompt output to the remote system for echo cancellation will tend to double the bandwidth required between the voice recognition server and the voice processing system, increasing overall system costs.

SUMMARY OF THE INVENTION

Accordingly the present invention provides a voice processing system having multiple telephony channels for making and receiving telephony calls including:

- means for communicating with a server including a voice recognition system for processing said telephony calls, said server being remote from said voice processing system;
- means for playing a prompt to a caller over a telephone channel;
- a voice activity detector for detecting caller input on said telephone channel;
- means responsive to said detection of voice activity for initiating transmission of the caller input to said remote voice recognition system;
- means for performing echo cancellation for said telephone call; and
- a line interface unit which incorporates both said voice activity detector and said echo cancellation means, whereby the caller input is processed by said echo cancellation means prior to being processed by said voice activity detector and prior to the initiation of the caller input to said remote voice recognition system.

The above approach allows the flexibility of a remote voice server to be used in a highly efficient manner, avoiding unnecessary transmission of non-voice data (typically silence) over the network, and unnecessary processing by the voice recognition system itself.

The preferred embodiment further includes means for requesting the voice recognition system to allocate a voice recognition channel for a telephone call. Such a request can be made either prior to playing said prompt in said telephone call, or else responsive to said detection of signal energy in said telephone call. The former approach ensures that voice recognition resources once allocated will be available for a call, but does not maximise usage of the recognition resources, in that there will be some recognition channels allocated but not actually receiving incoming voice data. By contrast, the latter approach offers potentially greater efficiency, since recognition channels are only allocated when needed; ie, when voice activity is actually detected. However, this approach suffers firstly from possible delays in the allocation of recognition resource after voice energy has been detected, and secondly from problems if no recognition resource is available when requested.

The preferred embodiment also includes an echo cancellation facility comprising: means for receiving said prompt being played out; means for processing said prompt to generate an estimated echo signal; and means for subtracting said estimated echo signal from the caller input on said telephone channel. The use of echo cancellation reduces the risk that an echo of an outgoing prompt might be interpreted as caller input, and thus considered as barge-in. It is further preferred that both the voice activity detector and the echo cancellation means are included in the line interface unit of the voice processing system. Caller input is then processed by said echo cancellation means prior to being processed by said voice activity detector (to avoid the risk of accidental echo-induced barge-in). Note that performing the echo cancellation in the line interface unit (as opposed to in the voice recognition system for example) is most convenient, since firstly the echo is removed at the earliest possible point in the voice processing system, and secondly because the line interface unit already receives the outgoing signal from which the echo is calculated; in other words, there is no need to specially route a copy of the outgoing signal to a separate echo cancellation unit, in addition to that being passed to the line interface unit for transmission out over the telephone network.

The preferred embodiment further comprises means for buffering the caller input, wherein responsive to a detection of voice activity, the buffer contents are transmitted to said voice recognition system. Thus caller input for the time-lag between the onset of voice activity and the triggering of the voice activity detector can be preserved. This ensures that the start of the caller's speech is not clipped, and therefore improves recognition accuracy.

The invention also provides a method of providing barge-in support on N telephony channels in a voice processing system including a line interface unit for connecting to N or more channels, using a voice recognition system capable of performing voice recognition on up to M channels simultaneously, where N>M and M>1, the line interface unit also including a voice buffer and voice activity detection means, the method comprising for each of said N telephony channels:

- transmitting an outgoing telephony signal through the line interface unit;
- buffering the incoming telephony signal in the voice buffer;
- detecting voice activity in the incoming telephony signal;
- responsive to such a detection, initiating the forwarding of the incoming telephony signal plus buffered portion to the voice recognition system; and
- performing echo cancellation in said line interface unit, said echo cancellation being initialised at the start of a telephone call.

This approach seeks to maximise recogniser efficiency by only consuming recogniser resource after voice activity has been detected. Otherwise, the usage of such voice recognition resources for barge-in is very wasteful, since they will be employed throughout the play-out of this prompt (ie for all the time that bargein is enabled), irrespective of when or whether the caller provides any input to be recognised.

In a preferred embodiment, the voice recognition system is provided on a remote server, and the step of forwarding the incoming telephony signal plus buffered portion to the voice recognition system comprises transmission over a local area network to the server. In these circumstances triggering data transmission upon the detection of voice activity not only improves the efficiency of recogniser usage, but also avoids unnecessary traffic on the network if there is no caller input of interest. It is also preferred that the server opens a virtual session to receive the incoming telephony signal, and subsequently allocates said virtual session to one of said M voice recognition channels. The use of flexible sessions provides the server with the flexibility to maximise the utilisation of its recognition channels.

It is also preferred that the method further comprises the step of performing echo cancellation in said line interface unit, said echo cancellation being initialised at the start of a telephone call. This is to be contrasted with many prior art systems, where the echo cancellation is performed by the recognition resource, and so no initialisation can be performed until the recognition resource is specifically requested and allocated. Note that the prior art approach is particularly wasteful where a single call can result in multiple accesses to the voice recognition resource system, leading to corresponding multiple initialisations of the echo cancellation facility.

The invention also provides a voice processing system having multiple telephony channels for handling telephony calls including:

a voice recognition resource;

means for playing a prompt to a caller over a telephone channel;

means for receiving caller input from said telephone channel;

means for storing said caller input in a buffer;

and means for forwarding said caller input from said buffer into the voice recognition resource at faster than real-time.

The use of the buffer allows incoming telephony data to be accumulated, and then sent at faster than real-time into the recogniser. This allows a recogniser channel to be operated at maximum capacity, rather than clocked by the real-time arrival rate of data. This in turn reduces the number of channels required on the recogniser, and so can reduce costs.

In the preferred embodiment, the voice recognition resource is provided on a server machine, with the buffer also being provided on said server machine, and being directly associated with the recognition resource. This allows buffer operation to be aligned to the processing capabilities of this particular recognition resource, for example, in terms of maximum data handling rate.

In one preferred arrangement, there are a plurality of virtual session handlers, each capable of processing caller input from one telephony channel, and each including a buffer for storing caller input from this telephony channel. The buffer control system then associates a virtual session with a real channel in said voice recognition system as appropriate, for example, as and when a free recognition channel becomes available.

Note that in the above context, references to callers should be interpreted as simply meaning the person to whom the voice processing system is connected over the telephone network. In other words, the call itself need not necessarily have been initiated by the caller him/herself, but perhaps by the voice processing system itself, or even by some third party (such as an agent at the call centre where the voice processing system might be located).

BRIEF DESCRIPTION OF THE DRAWINGS

An embodiment of the invention will now be described in detail by way of example only with reference to the following drawings.

DETAILED DESCRIPTION

Figure 1:
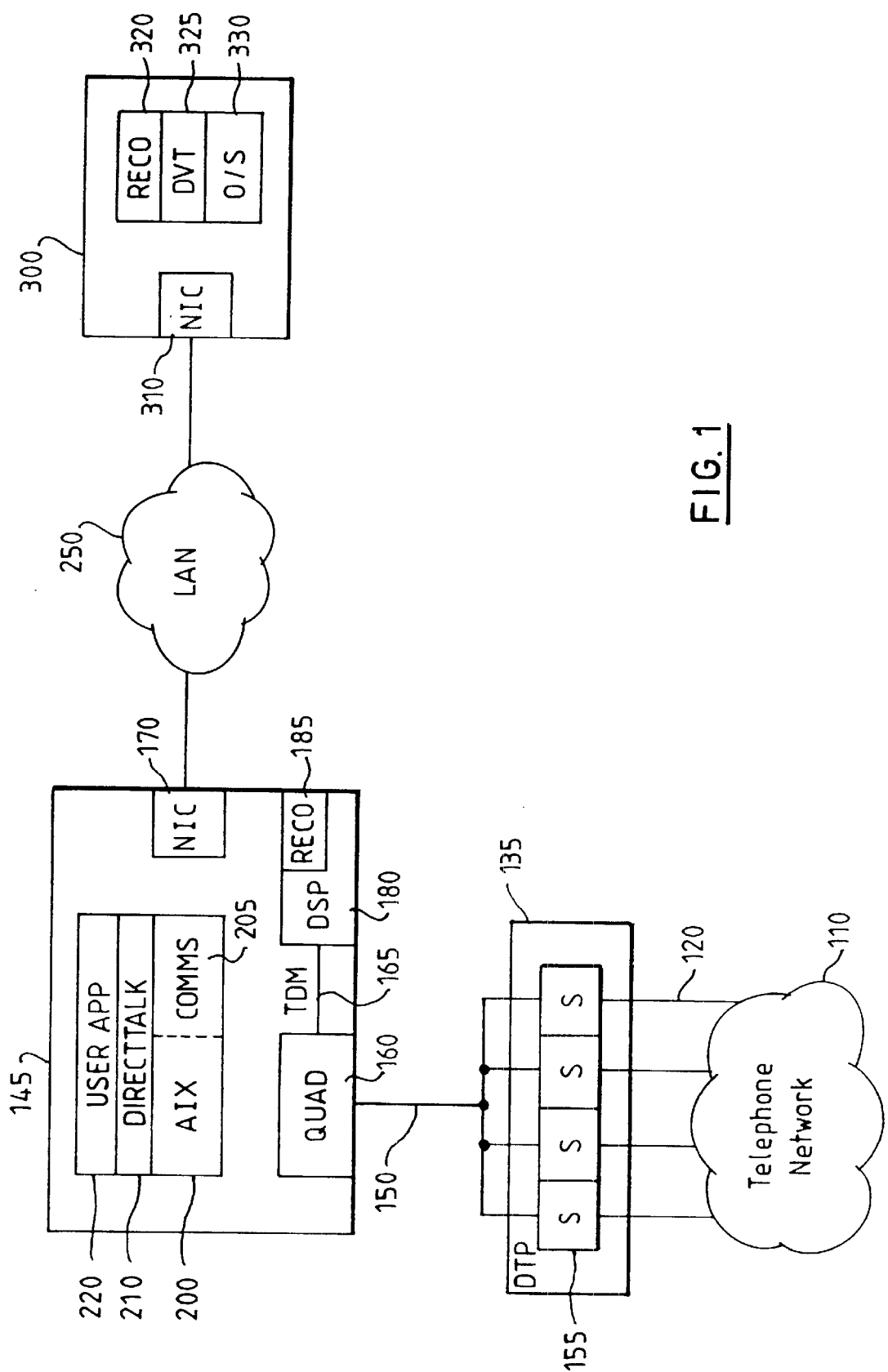
FIG. 1 is a simplified schematic diagram of a voice processing system connected to a remote server.

FIG. 1 illustrates in simplified schematic form the main hardware and software components of the DirectTalk for AIX voice processing system, available from IBM Corporation. The voice processing system is connected to the telephone network 110 by one or more digital trunk lines 120, each carrying multiple telephony channels (T1 digital trunk lines in North America comprise 24 channels, E1 digital trunk lines in Europe comprise 30 channels). It will be appreciated that in some installations, the digital trunk lines may be connected to the telephone network 110 via a switch or PBX; indeed one possibility is for the voice processing system to effectively be a part of the telephone network itself, providing intelligent services to the network.

The voice processing system has two main components, a line interface unit 135 and a system unit 145. The line interface unit 135 is also referred to as the digital trunk processor, and contains one or more subsystems known as SPACKS. Each SPACK 155 terminates one digital trunk line and is responsible for interfacing with the telephone network over that line, including signalling, demultiplexing incoming telephony signals, and so on. In addition; each SPACK contains digital signal processors DSPs) which can be used to perform various functions, such as detection of voice activity on a particular telephony channel, compression/decompression of voice signals, and DTMF recognition. The microcode for running on the SPACKs is downloaded from the system unit onto the digital trunk processor 135 when the voice processing system is powered on.

The system unit 145 of the DirectTalk voice processing system comprises an RS/6000 workstation, which runs the AIX operating system 200. The DirectTalk voice processing program 210 runs on top of the AIX operating system, and in turn interacts with a user application 220 in order to determine how calls should be processed. The system unit includes one or more trunk adapter cards 160 for interfacing to the digital trunk processor 135 via link 150. The adapter illustrated in FIG. 1 includes a single QUAD adapter, which can be connected to up to four SPACKs simultaneously. The system unit also contains a network interface card 170 which allows programs running on the workstation to communicate over a local area network (LAN) 250, using communications software 205 incorporated into the AIX operating system. In addition, the system unit includes a digital signal processing (DSP) card 180, which is connected to the trunk adapter (or adapters) via a time division multiplex (TDM) bus 165. Speech recognition software 185 is installed on the DSP card. In the present implementation, the TDM bus comprises an SCbus, and the DSP card comprises an Antares card, both available from Dialogic Corporation, New Jersey, USA, whilst the speech recognition software on the DSP card is supplied by Voice Control Systems Inc (VCS), of Texas, USA, although other recognition systems could be used.

It will be appreciated that there are many possible variations in the design of the voice processing system of FIG. 1. For example, some voice processing systems accept input from analog lines rather than digital trunks; whilst some voice processing systems combine the digital trunk processor and trunk adapter into a single adapter card located in the system unit. The skilled person will appreciate that such variations are not pertinent to the principles of the present invention.

Also, it should be noted that a TDM bus connection as shown in FIG. 1 provides a uni-directional data flow, so that as is well-known in the art, a pair of such connections are needed to support a full duplex telephone conversation. Thus for situations where a duplex link is required, references herein to a telephone connection and such like should be taken to imply sufficient connections as are necessary; similar considerations apply throughout the voice processing system—ie not just for the TDM bus).

Returning now to FIG. 1, a server system 300 is attached to the LAN 250 via network interface card 310, and supports an operating system 330, speech recognition software 320, and a DVT ("distributed voice technology") software subsystem. The server communicates with the voice processing system via the DVT subsystem 325 and a suitable communications stack in the operating system 330. In the present implementation, the server 300 is another RS/6000 workstation running the AIX operating system, and the speech recognition software is the HARK recogniser available from BBN HARK Systems Corporation (BBN), of Massachusetts, USA, although other recognition systems could also be used.

Figure 2:
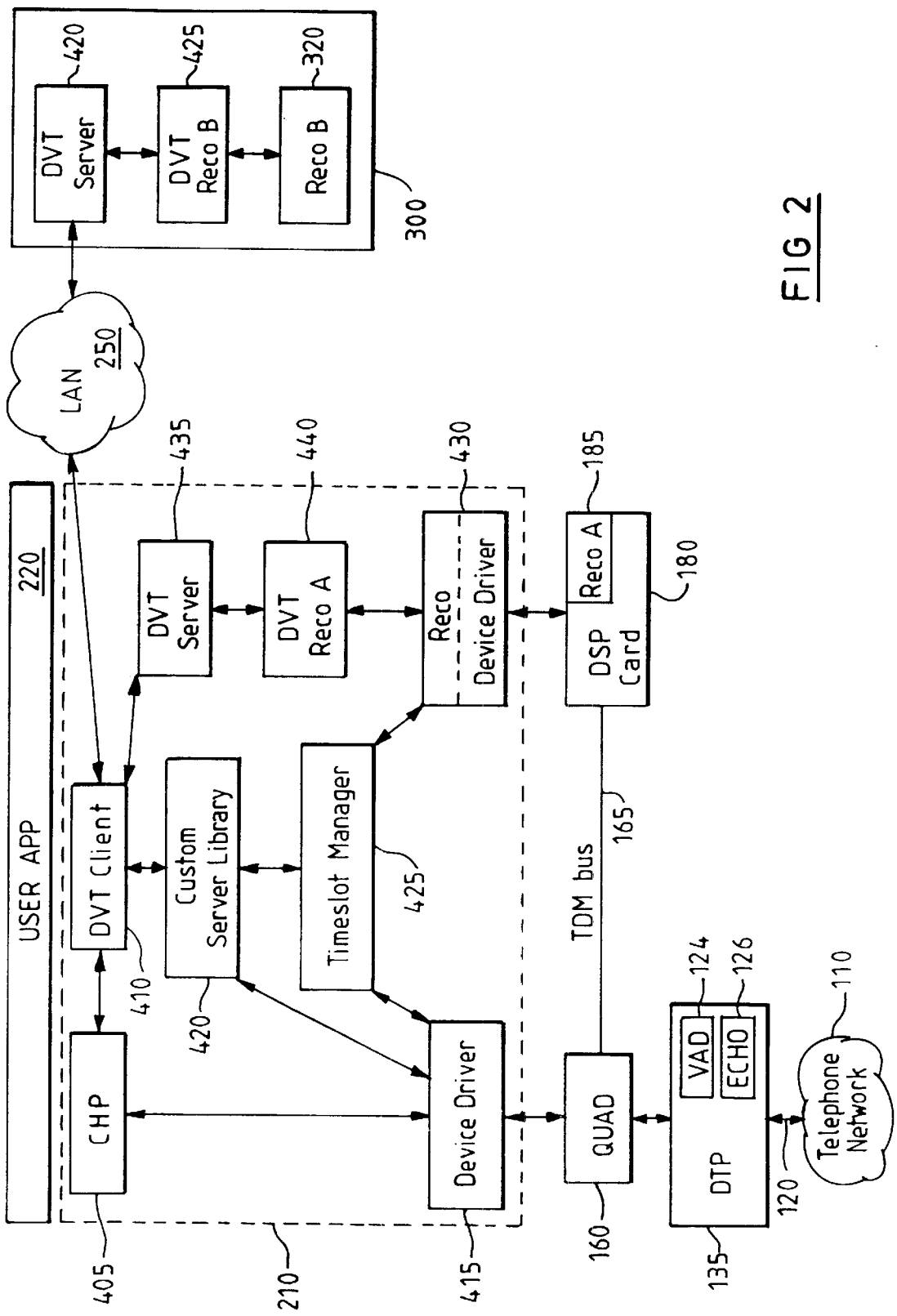
FIG. 2 shows further details of the voice processing system of FIG. 1.

As explained previously, it is desirable in many voice processing applications to perform speech recognition. FIG. 2 illustrates in more detail the main components necessary for an understanding of how this can be accomplished for the DirectTalk system (for clarity, certain standard components such as the operating systems have been omitted from this diagram). In particular, FIG. 2 illustrates pertinent features of the DirectTalk voice processing program 210, including the channel processor 405, which is used to interpret user applications 220. The channel processor and relevant call processing script (known as a state table) is invoked either in response to receipt of an incoming call as detected by the digital trunk processor, and notified via the device driver 415 for the trunk adapter 160, or as initiated by the application itself.

As shown in FIG. 2, there are two voice recognition resources available to the application. The first of these, denoted as Reco A 185, is installed on the DSP card 180 in the system unit. The second voice recognition resource, Reco B 320, is available remotely via the LAN 250 on server 300. Associated with each speech recognition resource is a corresponding DVT server subsystem (server 435 for Reco A and server 420 for Reco B0), which is responsible for allocating voice recognition resources to different telephony channels for its respective speech recognition resource (more precisely, a recognition resource is allocated to the user application which is responsible for handling a particular telephony channel). The DVT server and associated resource communicate via a corresponding DVT Reco subsystem (subsystem 440 for Reco A and subsystem 425 for Reco B). The purpose of this subsystem is to insulate the DVT server from needing to know the details of any particular speech recognition system. In other words, there is a generic interface between the DVT server and the DVT Reco subsystem, with the latter then performing any translation necessary for the particular speech recognition system to which it is attached.

Note that since Reco A is installed on DSP card 185, it is controlled via a corresponding device driver 430 (this driver is shown as split into two components, the first at a higher level relating to the recognition software itself, the second to the general DSP card). By contrast, Reco B is a purely software system, and so does not need any device driver.

The channel processor interacts with a DVT server via the DVT client 410. In the context of the DirectTalk voice processing system, the DVT client represents a custom server, which can exploit a set of functions available in the custom server library 420. These functions allow a custom server (such as DVT client, or another user-written custom server) to process telephony data in ways not directly available to a state table via the channel processor. Examples of the use of the custom server are presented in the IBM AIX DirectTalk v1.6 Voice Application Development guide, reference number SC33-1722-00, and other manuals referenced therein, available from IBM Corporation.

One particular function in the custom server library can be used to instruct a timeslot manager 425 to connect a channel on the trunk adapter with a channel on the DSP card via the TDM bus. This is achieved by the timeslot manager sending appropriate instructions to the trunk adapter and DSP card via their respective device drivers.

Also shown in FIG. 2 are two particular pieces of code which execute on DSPs included within the digital trunk processor 120. The first of these is a voice activity detector (VAD) 124, which monitors the incoming telephone signal to discriminate the presence of voice energy on the line (as opposed to silence, DTMF and other signalling tones, and hopefully most noise). In response to the detection of voice energy on the line, the VAD sends a notification back to the system unit 145 via the trunk adapter card 160 and associated device driver 415. Note that there will normally be a slight delay between the onset of voice energy on the line, and triggering of the voice activity detector, in order to prevent accidental triggering by transient noise. This delay is not normally significant in terms of response time to the caller, being typically up to something like 0.1 seconds, depending on the particular voice detection algorithm used (nb suitable algorithms are well-known in the art, see for example U.S. Pat. No. 5,533,118).

The other piece of code shown in FIG. 2 as executing on the digital trunk processor is the echo cancellation facility 126. For each channel, the echo cancellation code monitors the outgoing signal, and applies an appropriate transformation (including delay) to produce an estimated echo signal. This estimated echo signal is then subtracted from the incoming telephony signal to provide echo cancellation. The transformation to produce the estimated echo from the outgoing signal is based on a set of echo coefficients. The derivation of suitable echo coefficients as each channel connection is formed is well-known in the art (see for example U.S. Pat. Nos. 4,751,730 and 5,351,291).

Figure 3:
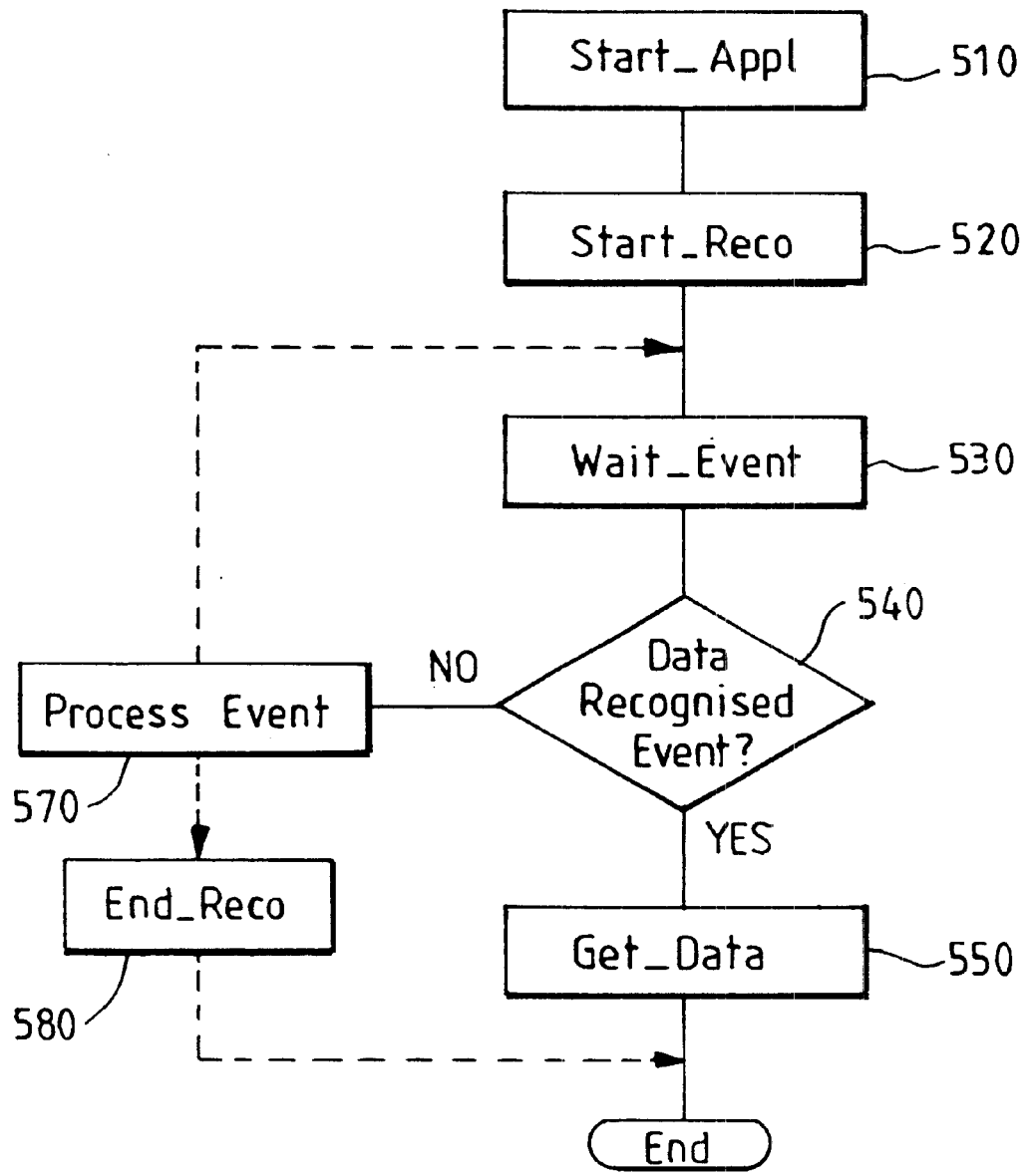
FIG. 3 illustrates the method steps for performing speech recognition using the voice processing system of FIG. 1.

The operation of the voice processing system discussed above for performing voice recognition will now be described with reference to FIG. 3. Thus when an application desires to use a voice recognition resource, an appropriate state table action is called to pass a corresponding request (Start_Appl) to the DVT client (step 510). This request identifies both the particular speech recognition resource to be used, and also specifies a recognition application (eg vocabulary and other information) to be used in conjunction with that resource.

As discussed in more detail below, the DVT client knows which recognition resources it has access to, but not which recognition applications they support. Therefore, the DVT client forwards this request to the appropriate DVT server, which then interrogates its associated voice recognition system via the DVT Reco subsystem to ascertain whether or not the recognition application is supported, and if so, whether there is a free recognition channel currently available. Assuming this to be the case, the free channel is reserved, and the DVT server sends a positive response back to DVT client. Note that so far, the processing is essentially the same, independent of whether the DVT server is associated with a remote server voice recognition facility or with a local DSP card supporting voice recognition. It will also be appreciated that at this point, no incoming telephony data is being transferred into the recognition system.

The next action of the DVT client depends on whether Reco B or Reco A (of FIG. 2) has been selected, and more particularly on whether the recognition resource is to be accessed via the TDM bus, or via a data communications channel (the DVT client is aware of this information as described in more detail below). In the former case DVT client makes a call into the custom server library which results in setting up a link between DVT client and the trunk adapter device driver. In particular, this link allows DVT client to extract incoming telephony data off the trunk adapter for a desired channel. This data can then be transmitted over the LAN to the server. In fact, two possible modes of operation are supported for the server. In the first mode, the telephony data is transmitted to DVT server, and then passed down through the DVT Reco subsystem into the recognition resource. Alternatively, in the second mode, data is transmitted direct from DVT client to the recognition resource. This second mode allows slightly quicker transfer of data between DVT client and the recognition resource, but does require the recognition resource to be able to receive the data transfer in the correct format. Note that all commands (as opposed to data) between DVT client and the remote server system use the first mode of communication.

On the other hand, where the voice recognition is to be performed by code running on the DSP card, an appropriate connection must be established over the TDM bus between the trunk adapter and the DSP card. This is accomplished via the custom server library, by means of a call to the timeslot manager. This call specifies the number of the relevant channel on the trunk adapter, and the number of the free channel which has been allocated by the recognition system. The timeslot manager then makes calls to the device drivers for the trunk adapter and the DSP card to connect these two channels to a particular timeslot on the TDM bus, to allow telephony data to be received into the voice recognition resource. In this arrangement therefore, the voice data flows directly from the trunk adapter card onto the DSP card. However, although voice data is now being received by the Reco A, it is not, as yet, being processed (ie it is simply being discarded, save for the line convergence discussed below).

The next state table action serves to start recognition (step 520) via a Start_Reco call into DVT client. In both cases (ie for both Reco A and for Reco B), after the Start_Reco has been issued and DVT client informs the state table that this command has been successfully received, the state table now generally enters a Wait_Event state (step 530), in which it can receive notification of various possible events, such as DTMF recognition, caller hang-up, and so on. Meanwhile, the recognition resource processes the incoming telephone signal, until it has recognised the word or phrase spoken. The recognised text is then returned via DVT server and DVT client, which provides an appropriate event (step 540) to the application (for design reasons this event is actually routed through the trunk adapter device driver, which is specifically enabled to send events to the application; however the event could equally well be passed directly from DVT client to the state table). On receipt of this event, the application issues a Get_Response command to DVT client (step 550), which then returns the recognised text back to the application.

The application may now decide to release the recognition resource, this being effected via a End_Appl call to DVT client (not shown in FIG. 3), resulting in an appropriate message to the relevant DVT server. Note that some applications effectively hold a voice recognition channel for an entire call, whilst others allocate and then deallocate for each user response (or some intermediate strategy). This latter approach in theory leads to more efficient use of recogniser channels, but does suffer from additional overheads with respect to the increased allocation and deallocation of channels.

Returning for a moment to the Wait_Event state at step 530, if the next incoming event at step 540 does not correspond to the notification that speech has been recognised, then that event is processed accordingly (step 570). Depending on the nature of this event, the state table will then either return into the Wait_Event state (ie back to step 530), or may exit (for example if caller hang-up is detected). In the latter case the recognition system can be allowed to complete the recognition, but its response ignored, but preferably the application issues an End_Reco call (step 580), which is passed from DVT client to the relevant recognition system. This command causes the recognition system to explicitly abort the relevant recognition process, thereby conserving system resources.

The preceding description has focussed on the general provision of speech recognition for a voice processing system. The present embodiment allows this speech recognition to be turned on at the same time that a prompt is being played out to the caller, thereby allowing the caller to make a spoken interruption of the prompt. This facility, which is generally known as bargein or cut-through, is particularly useful for voice processing applications such as voice mail, where the caller is likely to encounter the same sequence of prompts repeatedly, and accordingly may be able to select a desired option without needing to listen to all of the prompt.

Figure 4:
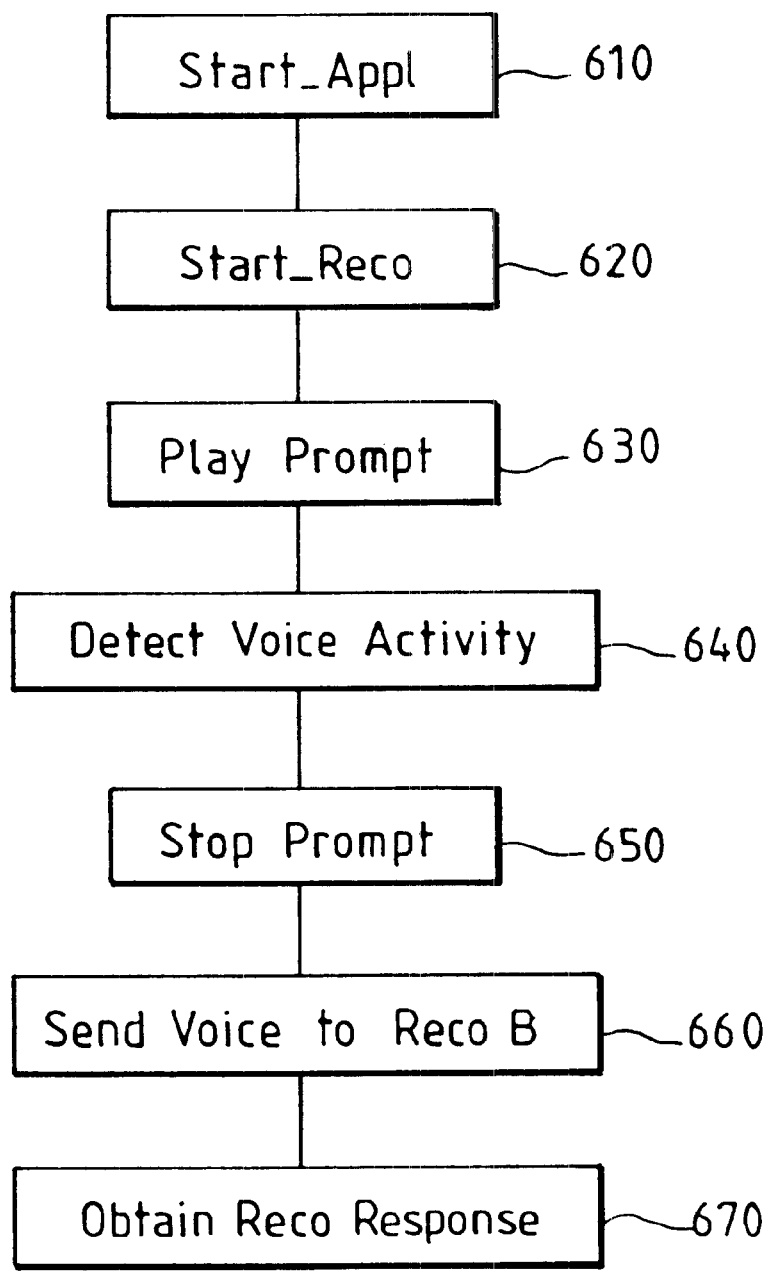
FIG. 4 illustrates the method steps for performing barge-in using the voice processing system of FIG. 1.

The process of performing barge-in is illustrated in FIG. 4, and begins with a request (Start_Appl) from the state table into the DVT client for a voice recognition resource (step 610). As before, this request specifies both a recognition system (ie A or B in the system shown in FIG. 2), and also a particular recognition application to be used for this recognition. For present purposes, it is assumed that the application requests a resource which is located on the server, in other words, Reco B, and that this resource is available. Thus the DVT client sends a request to the DVT server to reserve the requested resource, which DVT server does by appropriate interaction with the DVT Reco subsystem associated with Reco B. A response is then sent from DVT server back to DVT client, and from there to the application, indicating that the requested resource has been allocated. In addition, the Start_Appl command causes the appropriate data connections to be set up (same as for FIG. 3) Next, the state table issues a Start_Reco command (step 620). By setting a parameter in this command, it is possible to specify when recognition should start; for example, immediately, or after a "beep" played by the voice processing system. For barge-in, speech recognition is requested to start upon the detection of incoming voice energy. Therefore, initially no telephony data is transferred to the server, and no speech recognition is performed.

Next, a voice prompt is played to the caller, via a conventional state table action (step 630). The state table action allows an application designer to specify that prompt output should be stopped in particular eventualities. For example, one such eventuality is where the caller inputs a DTMF tone, which is recognised by appropriate software within the digital trunk processor (not shown in FIG. 2). This DTMF tone can then be returned to the state table from the DTP via the trunk adapter and its device driver. For barge-in, an application can specify that prompt output should be terminated in response to voice input. Thus in this case, the voice activity detector in the digital trunk processor monitors incoming audio for voice activity. When (if) voice energy is detected (step 640), then the DTP notifies the trunk adapter device driver through the trunk adapter, and the device driver responds by terminating output of the prompt (step 650).

In order to provide barge-in, it is necessary not only to detect the voice input, but also to be able to recognise it. To achieve this, the incoming telephony signal is received by the trunk adapter device driver, sand written continuously into a circular buffer. The size of this buffer is at least sufficient to store data corresponding to the time which it takes the voice activity detector to trigger on voice input. As long as no voice signal is present on the incoming line, the device driver cycles round the circular buffer, overwriting the input after a pre-determined time. However, responsive to notification from the voice activity detector that voice energy is now present on the incoming line, the device driver makes available to DVT client the incoming telephony data, including the data in the circular buffer representing the start of the voice input. This ensures that the beginning of the caller's response is not lost. The DVT client now transmits this data to the DVT server, which passes it to Reco B (step 660), bearing in mind that a recogniser channel has already been requested and is therefore available to receive this signal. The transfer of data between the DVT client and Reco B may occur in either of the two modes discussed above.

After the caller's response has been recognised, Reco B returns to DVT client via DVT server the recognised text. This is then passed to the state table application by the DVT client (step 660) using the same mechanism as described in relation to FIG. 3 (ie putting the application into a Wait_Event state, and then issuing a Get_Response command upon being notified that data has arrived back into the DVT client). The state table can then take whatever action is appropriate, given the recognised word.

One reason for the slightly complicated method of returning text from the recognition system to the state table is that once a state table issues a DVT call, it waits for a response before proceeding to the next action. In an earlier version of the DVT interface, this meant that after a Start_Reco command, the state table would then wait until the recogniser returned the actual text back to it. This arrangement is fine for voice recognition on caller input which does not start until after completion of the relevant prompt. However, for barge-in it will be appreciated from FIG. 4 that the state table performs two actions simultaneously, namely recognition (starting with step 620), and playing a prompt (step 630). Thus, it is not possible for the state table to go into a waiting state after the Start_Reco, since it needs to follow this by playing a prompt. Therefore, a more asynchronous model is adopted, whereby a positive response to Start_Reco is returned simply to indicate that recognition has (can) begin. This approach necessitates the subsequent Get_Response call in order to retrieve the actual recognised text. Note also that it is not advisable to automatically issue the Get_Response call straight after the play prompt command, since this will cause the state table to block waiting for data from DVT client. In such a condition, the state table is unable to react, should the caller for example hang-up, not speak at all, or provide a DTMF input. Instead, the Wait_Event state is used at this point (see step 530, FIG. 3). This ensures that the DVT client actually does have recognised data available before the Get_Response call is issued, and therefore is in a position to properly return the recognised text to the application.

The approach described above avoids the need to process the incoming voice signal, other than in the voice activity detector, until it is known that something of interest has been received (ie other than silence or noise). In particular, this reduces internal processing requirements at the voice processing system and at the remote recogniser, and also reduces transmissions over the network from the voice processing system to the server.

Note that by initially allocating the recogniser channel when barge-in is first enabled, rather than at the detection of voice activity, the system ensures that appropriate recognition resource is already available when required. However, it would be possible to modify the approach described herein to try to enhance recognition resource usage. One possibility would be to support over-allocation of recognition resources at the server, in view of the fact that not all allocated recognition channels will actually be processing data at any one time. For example, if Reco B is installed on a server system that supports say 20 channels of real-time voice recognition simultaneously, then one can contemplate allowing up to say 25 channels of recognition to be allocated at any one time. Because allocated channels are not continuously used, then the number of channels actually operating is expected to be below the channel limit. Of course the possibility would remain that in rare cases the 20 channel limit might be exceeded, resulting in recognition delays (one would have to ensure that this did not cause actual errors or system problems). This over-subscription strategy attempts to maximise the usage and hence overall efficiency of the recogniser. It will depend on the details of an application itself whether such over-subscription is feasible and desirable, or whether a more conservative approach (corresponding perhaps to zero over-subscription) should be favoured.

A somewhat different strategy for trying to maximise recogniser efficiency is to delay requesting recogniser resource for a particular channel until voice activity has actually been detected on the incoming line. This approach tries to optimize recogniser efficiency, although it does require that the allocation of and connection to a recognition channel (if available) can be performed quickly. Also, it is more difficult to control the degree of any possible excess demand for recogniser channels (ie over-booking), other than through broad constraints on numbers of actual telephone lines in operation.

It will be appreciated that the over-subscription techniques described above are not limited in application to barge-in, but could in theory be applied to all recognition channels. However, such techniques are particularly attractive for barge-in, because this ties up allocated recognition channels even when no active recognition is in progress (since one cannot predict in advance whether or not a particular caller will interrupt).

Note that in the embodiment described above, the time taken to trigger the voice activity detector introduces a time-lag (latency) between the voice input awaiting to be processed, as stored in the circular buffer, and the current input from the caller. This in turn can lead to a delay between the caller finishing their response, and the recogniser being able to process this data. In order to minimize such a delay, it is preferred that the buffered audio data is fed to the recogniser faster than in real time, that is, faster than the actual rate at which the audio is actually spoken. There is of course no fundamental reason why the recogniser should not process audio data in less than real-time, providing the server is a sufficiently powerful machine. This technique reduces any delay as perceived by the user.

In addition, the buffering of incoming audio data and subsequent recognition in less than real-time represents another potential optimisation of recogniser performance. Thus this matches throughput to the maximum possible level of the recogniser, rather than limiting processing to the voice input rate from the caller. Note that this buffering can in fact occur anywhere in the audio path, such as in the DVT client or in the DVT server, as well as in the device driver as described above. Probably the most preferred approach is to perform this buffering in DVT Reco, since it can then be tailored to the capabilities of the recognition resource. This is particularly advantageous where the voice processing system has access to two or more voice recognition resources (either on the same or different servers). For example, the maximum acceptable data input rate may vary from one recogniser to another, and also there may be little benefit in performing the buffering at times when the recogniser is lightly loaded.

One possible arrangement is to use this technique in conjunction with the just-in-time allocation of recognition channels; in this case the buffering doubles as a temporary holding stage should no recognition resource be available when requested. However, after such resource does become available, the faster than real-time delivery to the reco system and corresponding processing makes the buffering transparent to callers. In one embodiment, DVT Reco provides a plurality of virtual session handlers, each capable of processing caller input from one telephony channel. Each handler also includes a buffer for storing caller input from this telephony channel. DVT Reco then associates a virtual session with a real channel in said voice recognition resource as appropriate, for example, when there is a certain amount of voice data in the buffer, or as and when a recognition channel becomes available. At this point, the data is emptied from the buffer into the recogniser at faster than real time.

(Indeed, the use of virtual sessions to receive data into DVT Reco, which can then be allocated to a free recognition channel when available, provides an effective buffering mechanism for maximising usage of the voice recognition resource, irrespective of whether or not the voice is fed into the recogniser at a faster than real-time rate when a recognition channel allocation is made).

Sending the data to the recogniser faster than real-time minimises the number of necessary recognition channels. This is important, since most commercial speech recognition systems are generally priced according to the number of channels that can be simultaneously supported. Note also that this buffering of voice data for faster than real-time recognition is generally beneficial for all voice recognition actions (not just barge-in).

One limitation on the amount of buffering that can be performed is that it is not generally possible to determine in advance how long caller input will last. Thus it is not appropriate to buffer for five seconds, if the caller input is only for one second, since this then adds a four second delay into the recognition process. However, in many cases, it will be possible to estimate the likely caller response duration, and set the amount of buffering according; for example, the buffering time for an expected single digit response would be shorter than if the caller has been asked to give their post code (Zip code). Note that where the caller continues to talk after all available data is passed to the recogniser in faster than real-time, then subsequent input will be at the natural rate of caller input. The most efficient approach is to use the voice activity detector for a second time, in order to determine when caller input has stopped (ie when voice activity on the line has terminated). This can then trigger the release of the complete caller utterance from the buffer into the voice recognition system, optimising utilisation of the recognition resources. This approach is most suited to situations where caller input is relatively short and simple; fortunately corresponding to those situations where voice recognition itself is most likely to be employed.

The above discussion of barge-in has focussed on the server implementation. However, the voice processing system of FIG. 2 also supports barge-in for TDM reco (Reco A) via the same set of application calls to DVT client, although the resulting processing is somewhat different. Thus returning to FIG. 4, upon the Start_Appl command (step 610), the timeslot manager forms a connection over the TDM bus between the incoming telephony channel and the allocated recognition channel in Reco A. The incoming telephony signal is then automatically routed into the recognition program on the DSP card (irrespective of whether the DVT client requested recognition to start at once, or upon detection of voice activity). The recognition program itself then becomes active upon the Start_Reco command (step 620) and listens to the incoming signal to detect voice activity; responsive to such a detection (step 640), the DVT client is notified accordingly. This information is then passed from the DVT client to the trunk adapter device driver, which stops the outgoing prompt (step 650). In the mean-time, telephony input data continues to flow into the recognition system over the TDM bus (effectively analogous to step 660), until a detection is made, whereupon Reco A notifies DVT client that a recognition result is available. The DVT client then informs the application of this, using the same approach as for the server solution, thereby prompting the application as before to issue a Get_Response command in order to retrieve the recognised response (step 670).

Considering now the role of the echo cancellation software 126 (see FIG. 2), the echo cancellation coefficients are initialised for each telephone call by calling an appropriate system variable. This causes the actual initialisation routine to run when the system next plays a prompt down that telephone line. Thereafter echo cancellation can be performed whenever barge-in is enabled to prevent the echoed prompt from being accidentally misinterpreted as a user interruption.

Many prior art voice processing systems rely on the voice recognition software running on a DSP card to perform echo cancellation, as opposed to performing this cancellation in the line interface unit as described herein. However, the use of echo cancellation in the line interface unit, rather than in the DSP card, offers several advantages. Clearly, it allows the use of recognition systems which do not themselves include any echo cancellation facility (for example, because they are not primarily designed for a telephony environment). In addition, with echo cancellation being performed in the line interface unit, the echo cancellation can be initialised just once at the start of a call. By contrast, echo cancellation in Reco A must generally be initialised each time the recogniser is allocated to a particular call. Admittedly, it is possible to keep a recogniser channel allocated to a single call throughout, but this represents an inefficient use of recogniser resources if there are long periods in the call for which voice recognition is not required; indeed, it will often not be known in advance how many times voice recognition will actually be required for a given call. Moreover, in some circumstances a call may require speech recognition from two or more different systems; for example, if recognition in two different languages is being performed simultaneously (with the incoming call data being transferred to both recognition systems, potentially on two different servers), or if recognition is initially required from one vocabulary on one system, and subsequently from another vocabulary on another system (or simply for load balancing reasons across multiple servers).

Clearly it is wasteful for each of these speech recognition systems to perform their own echo cancellation, when it can be done just once in the line interface unit.

Another benefit of performing the echo cancellation in the line interface unit is that the outgoing telephony signal necessary for estimating the echo to be subtracted is already available since it automatically passes through the line interface unit. By contrast, for Reco A to perform echo cancellation requires the use of an additional TDM timeslot to allow not only the incoming telephone signal but also the outgoing telephone signal to be routed into Reco A. Clearly this wastes bandwidth on the TDM bus.

A further benefit of performing the echo cancellation in the line interface unit is that it breaks the conventional one-to-one correspondence between echo cancellation resource and voice recognition resource. In other words, there is no need to allocate a voice recognition channel simply to perform echo cancellation on the incoming signal, rather, such allocation need only occur on actual detection of voice input. This is particularly important, given that recognition systems are normally costed on a per channel basis (ie according to the maximum number of channels that can be allocated simultaneously). Moreover, it is generally more efficient to perform the echo cancellation on dedicated DSP resources in the line interface unit, rather than in the comparatively more expensive voice recognition system.

In fact, the situation in the present implementation is somewhat more complex than indicated above, in that the TDM bus receives incoming audio data prior to echo cancellation, so that the audio data flowing into Reco A has not therefore been echo cancelled. Instead, the above-mentioned VCS recognition system provides its own echo cancellation facility, although this is not initialised in the manner described above. However, the VCS recognition system does perform a line characterisation, which essentially listens to the line during silence (hopefully), in order to determine the level of background noise on the line. The VCS recognition system makes this determination in response to the Start_Appl command, so that the relevant information is available when recognition commences following a Start_Reco command. More precisely, after DVT client sets up the TDM connection between the trunk adapter and the DSP card, it instructs the VCS recognition system to perform this line characterisation, before returning from the Start_Appl command. The state table is unable to perform any further actions whilst waiting for the return from the Start_Appl command, and therefore cannot play any prompts during this period, ensuring that there is silence on the line during the characterisation process.

Therefore, whilst the benefits of using echo cancellation in the line interface unit are not currently available in the present embodiment if Reco A is used, the system could be modified to change the data flow within the trunk adapter and digital trunk processor, such that data supplied to the DSP card over the TDM bus has already passed through the echo cancellation unit. (Note that although the TDM bus is connected to the trunk adapter card, the split or tap of the audio stream for the TDM bus when in use is made in the digital trunk processor).

Likewise, the buffering discussed above is also not available using the TDM approach in the current implementation. Again, however, such buffering could be added into the system, either at the line interface unit, or as a process running on the digital signal processing card.

An important aspect of the design of the present system is that the location of the voice recognition resource, including its manner of attachment (via TDM bus or not), is transparent to the user application. In other words, the interface between the user application and the DVT client is essentially independent of the underlying nature of the recognition resource being handled. This greatly increases the flexibility and portability of user applications, which can much more easily exploit new and improved voice recognition systems.

One reflection of the above feature is that the user application requests recognition resource purely in terms of the name of the recognition resource itself, and also the name of an associated recognition application. Thus it is the responsibility of the DVT client to locate this resource, however it is connected to the voice processing system.

In order to achieve this, both DVT client and DVT server send out a broadcast message when they are first brought up. Following this broadcast, a DVT client will receive responses from any available DVT servers. Thus the DVT client will know what DVT servers are currently available, and will also be informed of the recognition resources that they control. This information will include details of how to connect to the relevant recognition resource, in particular, whether or not the resource is attached via the TDM bus. Should any further DVT servers subsequently become available, the DVT client will become aware of their extra resources when the upcoming DVT servers broadcast their arrival. The DVT servers themselves become aware of their DVT Reco subsystem (or subsystems) by the latter making an appropriate API call into the former. Note that the relationship between the DVT clients and DVT servers is many to many, in that one DVT client may use multiple DVT servers, and conversely, one DVT server may be used by multiple DVT clients. In addition, a DVT server may control multiple different recognition resources on a particular machine, although there can only be one DVT server on any given system (in other words, the relationship between a DVT server and the DVT Reco subsystems is one to many).

It will be recognised of course that many variations are possible with respect to the voice processing system of FIGS. 1 and 2. For example, the illustrated system has access to both a server voice recognition system, and also to a local DSP recognition system, whereas many voice processing systems will have access to only one such resource. Further, any suitable network could be used for communications between the server and the voice processing system, providing it had suitable transmission characteristics in terms of bandwidth and latency (eg one possibility might be to use an ATM connection). In addition, although the voice processing system illustrated has just a single local DSP resource, some voice processing systems may include multiple DSP cards, and each card support multiple recognition programs running simultaneously. Moreover, Dialogic Corporation market an SCxbus adapter, which provides interconnection between TDM buses on different machines. Therefore, it would be possible to connect a recognition DSP card on one machine via this TDM bus extension to a trunk adapter on another machine. Conversely, although the server approach as shown has the recognition system installed on a separate machine from the line interface unit, it would clearly be possible for the software recognition system to be running on the same machine as the line interface unit, provided this machine had sufficient processing capability. This might be desirable if one wished to exploit some of the flexibility (such as the faster than real-time recognition described above) which is difficult to implement with the hardware/TDM bus configuration.

What is claimed is:

1. A voice processing system having multiple telephony channels for making and receiving telephony calls including:

- means for communicating with a server including a voice recognition system for processing said telephony calls, said server being remote from said voice processing system;
- means for playing a prompt to a caller over a telephone channel;
- a voice activity detector for detecting caller input on said telephone channel;
- means responsive to said detection of voice activity for initiating transmission of the caller input to said remote voice recognition system;
- means for performing echo cancellation for said telephone call; and
- a line interface unit which incorporates both said voice activity detector and said echo cancellation means, whereby the caller input is processed by said echo cancellation means prior to being processed by said voice activity detector and prior to the initiation of the caller input to said remote voice recognition system.

2. The voice processing system of claim 1, further including means for requesting the voice recognition system to allocate a voice recognition channel for a telephone call.

3. The voice processing system of claim 2, wherein said voice recognition channel is requested prior to playing a prompt in said telephone call.

4. The voice processing system of claim 2, wherein said voice recognition channel is requested responsive to said detection of voice activity in said telephone call.

5. The voice processing system of claim 1, whereby the means for performing echo cancellation for said telephone call comprises:

- means for receiving said prompt being played out;
- means for processing said prompt to generate an estimated echo signal;
- and means for subtracting said estimated echo signal from the caller input on said telephone channel.

6. The voice processing system of claim 1, further comprising means for buffering the caller input, wherein responsive to a detection of voice activity, the buffer contents are transmitted to said voice recognition resource.

7. The voice processing system of claim 1, wherein said means for communicating with said remote server comprises means for transmitting and receiving data over a local area network.

8. A method of providing barge-in support on N telephony channels in a voice processing system including a line interface unit for connecting to N or more channels, using a voice recognition system capable of performing voice recognition on up to an integer M channels simultaneously, where N>M and M>1, the line interface unit also including a voice buffer and voice activity detection means, the method comprising for each of said N telephony channels:

- transmitting an outgoing telephony signal through the line interface unit;
- buffering the incoming telephony signal in the voice buffer;
- detecting voice activity in the incoming telephony signal;
- responsive to such a detection, initiating the forwarding of the incoming telephony signal plus buffered portion to the voice recognition system; and
- performing echo cancellation in said line interface unit, said echo cancellation being initialised at the start of a telephone call.

9. The method of claim 8, wherein responsive to such detection, one of said M voice recognition channels is allocated to the telephony channel.

10. The method of claim 8, wherein said voice recognition system is provided on a remote server, and said step of forwarding the incoming telephony signal plus buffered portion to the voice recognition system comprises transmission over a local area network to said server.

11. The method of claim 10, wherein the server opens a session to receive the incoming telephony signal, and subsequently allocates said session to one of said M voice recognition channels.

12. The method of claim 8, further comprising the step feeding the buffered telephony signal to the voice recognition system at faster than real-time.

* * * * *